UNITED STATES PATENT OFFICE.

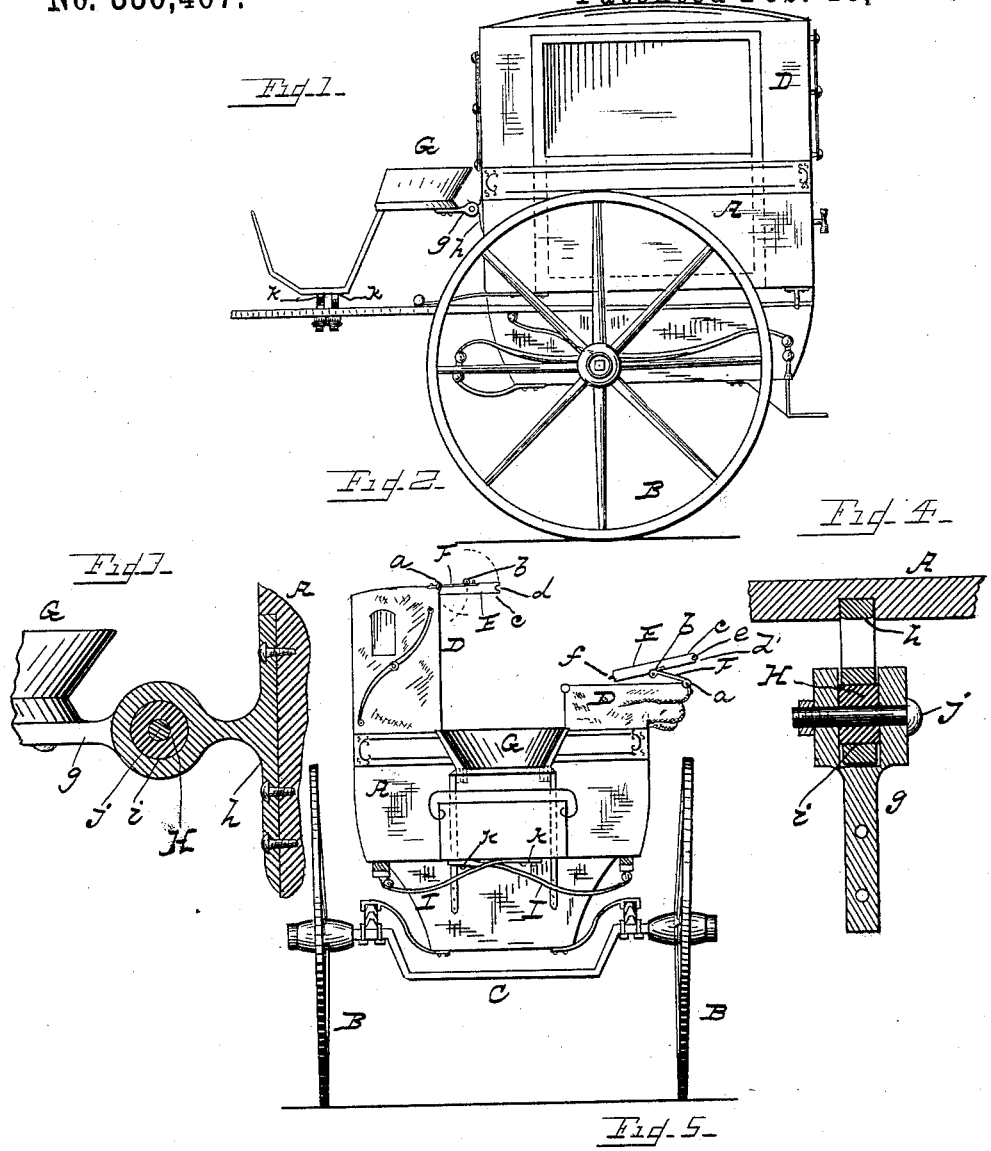

FREDERICK BEX AND EDMUND F. HEUNSCH, OF WASHINGTON, D. C.

TWO-WHEELED CAB.

SPECIFICATION forming part of Letters Patent No. 336,467, dated February 16, 1886.

Application filed November 30, 1885. Serial No. 184,352. (No model.)

*To all whom it may concern:*

Be it known that we, FREDERICK BEX, a subject of the Queen of Great Britain, and EDMUND F. HEUNSCH, a citizen of the United States, residing at Washington, in the District of Columbia, have invented certain new and useful Improvements in Two-Wheeled Vehicles, of which the following is a specification, reference being had therein to the accompanying drawings.

This invention relates to improvements in two-wheel vehicles; and it consists in the construction and novel arrangement of devices hereinafter set forth.

The annexed drawings, to which reference is made, fully illustrate our invention, in which Figure 1 is a side view of a two-wheel vehicle, showing our device. Fig. 2 is a front view of the same, and Figs. 3 and 4 are detail views, and Fig. 5 is also a detail view.

Referring by letter to the accompanying drawings, A designates the body, which is mounted upon wheels B, having the cranked axle C, all of the well-known construction. The top of the cab is composed of two sections, D D, which fold laterally when the top is lowered, and each section is provided with pivoted bridge-piece E E, the arm F of which is pivoted to the top frame, as at $a$, and the opposite end is pivoted to the bridge-piece E, as at $b$. The edges $c\,c$ of these pieces E E are each provided with a longitudinal groove, $d$ $d'$, in the latter of which is secured a strip of rubber or a rubber tubing, $e$, which enters the groove $d$ in the opposite bridge-piece when the top is raised, and presents a water-tight joint between said sections. The edge of each section or bridge-piece is provided with a spur, $f$, which is designed to engage a perforation made in the top frame, whereby each piece E E may be firmly supported when the top is in a raised position, and when the same is lowered said piece can be either set in a vertical position, as shown in dotted lines, Fig. 5, or the same can be let down to rest upon the frame.

G indicates the driver's seat, which is flexibly connected to the cab-body and the shafts by the following devices: The letter $g$ represents a bifurcated arm, which is secured to the seat, and is pivoted to a plate, $h$, having an eye, $i$, through which the bolt $j$ passes in coupling the eye and bifurcated arm to one another. Upon this bolt is arranged a rubber cushion or anti-rattler, H, which serves not only to prevent rattling of the pivoted joint, but affords an elastic or flexible connection between the seat and cab-body. To the foot portion of the seat are secured the ends $k\,k$ of cross-springs I I, which are shackled at their outer ends to the shafts. Thus by said construction we are enabled to provide a cab which will have no jarring or "horse motion," which we consider very important to relieve the vehicle therefrom; and by pivoting the bridge-pieces to the arms and pivoting the arms to the top frame said pieces can be adjusted to any desired position.

Having described our invention, what we claim, and desire to secure by Letters Patent, is—

1. In a two-wheel vehicle, the seat flexibly connected to the body and shaft by means of the hinged joint and springs I I, substantially as described.

2. The combination, with the body, of the seat having the bifurcated arm connected to the eye secured to said body, and provided with the rubber bearing upon the pivot-bolt, and the cross-springs secured to the seat and shackled to the shaft, as described and shown.

3. The combination, with the folding top, of the bridge-pieces or sections pivoted to the arms, which latter in turn are pivoted to the top frame of the vehicle, substantially as described.

4. The sections or bridge-pieces provided with the grooves, one of which having packing and both having spurs, whereby a water-tight joint is obtained to the top where the two sections meet, as and for the purposes set forth.

5. The two-wheel vehicle described, consisting of the body portion having the laterally-folding top provided with the bridge-pieces, constructed as described, having the spurs and grooves and packing material, the seat flexibly connected to the shafts by cross-springs and to the cab-body by the bifurcated arm pivoted to the eye secured to the body, and provided with the rubber packing, whereby rattling of the joint is prevented, and at the same time preventing jarring to the cab, substantially as described.

6. In a vehicle provided with two folding top sections, the combination therewith of a folding pivoted or hinged bridge piece or pieces adapted to cover or bridge the opening in the top, and rendered water-tight by means substantially as set forth.

7. In a two-wheel vehicle, the driver's seat pivoted to the cab-body and flexibly connected to the shafts or draft-pole, substantially as and for the purpose set forth.

In testimony whereof we affix our signatures in presence of two witnesses.

FREDERICK BEX.
EDMUND F. HEUNSCH.

Witnesses:
ENOS PHILLIPS,
WM. H. BATES.